United States Patent Office 2,734,447
Patented Feb. 14, 1956

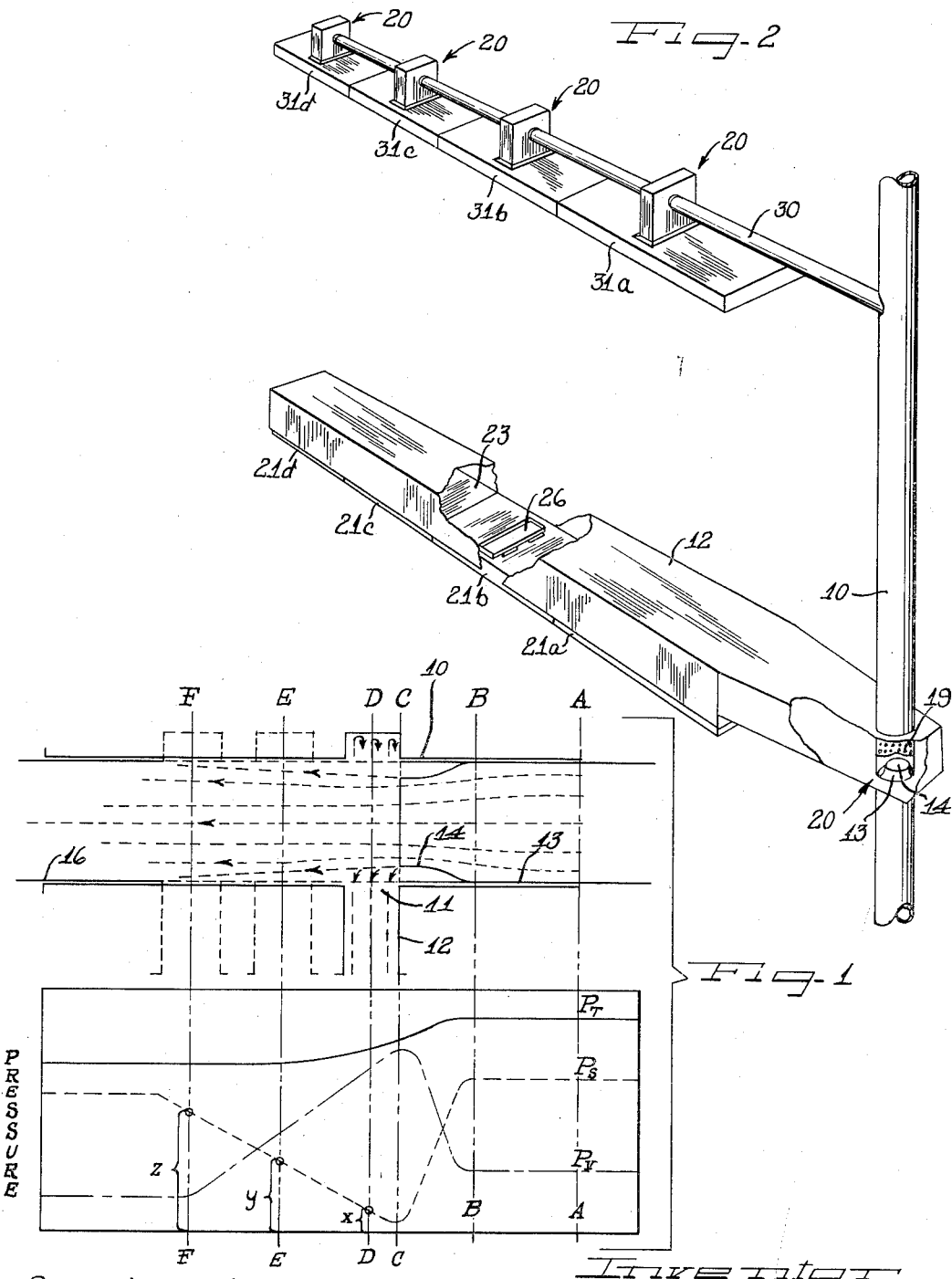
Feb. 14, 1956 — E. J. KUREK — 2,734,447
HIGH PRESSURE CONVERTER
Filed June 20, 1951 — 3 Sheets-Sheet 1
POINTS ALONG THE AXES OF FLOW FOR THE CONVERGING-DIVERGING PORTIONS OF THE AIR STREAM
Inventor
Edwin J. Kurek

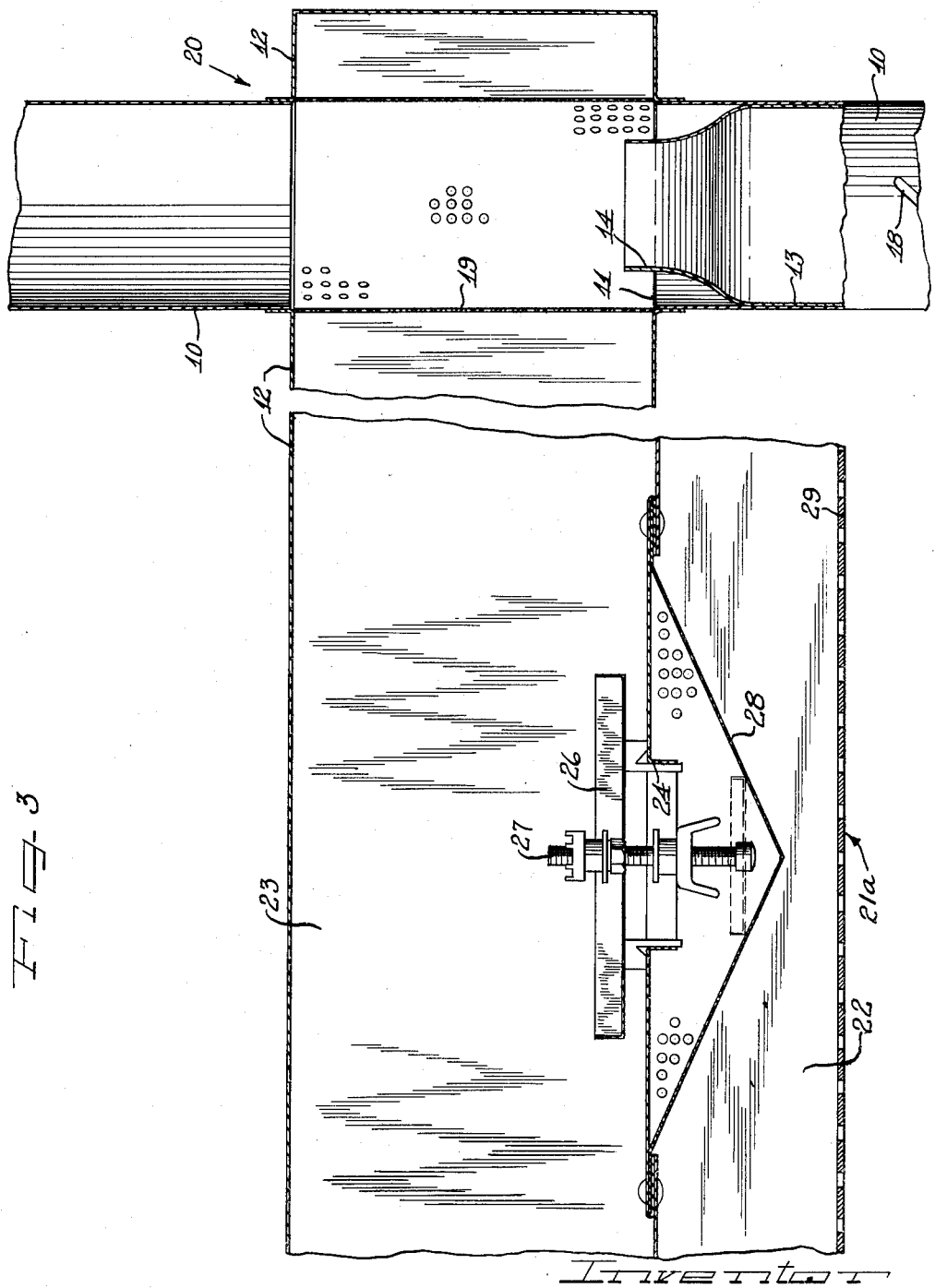

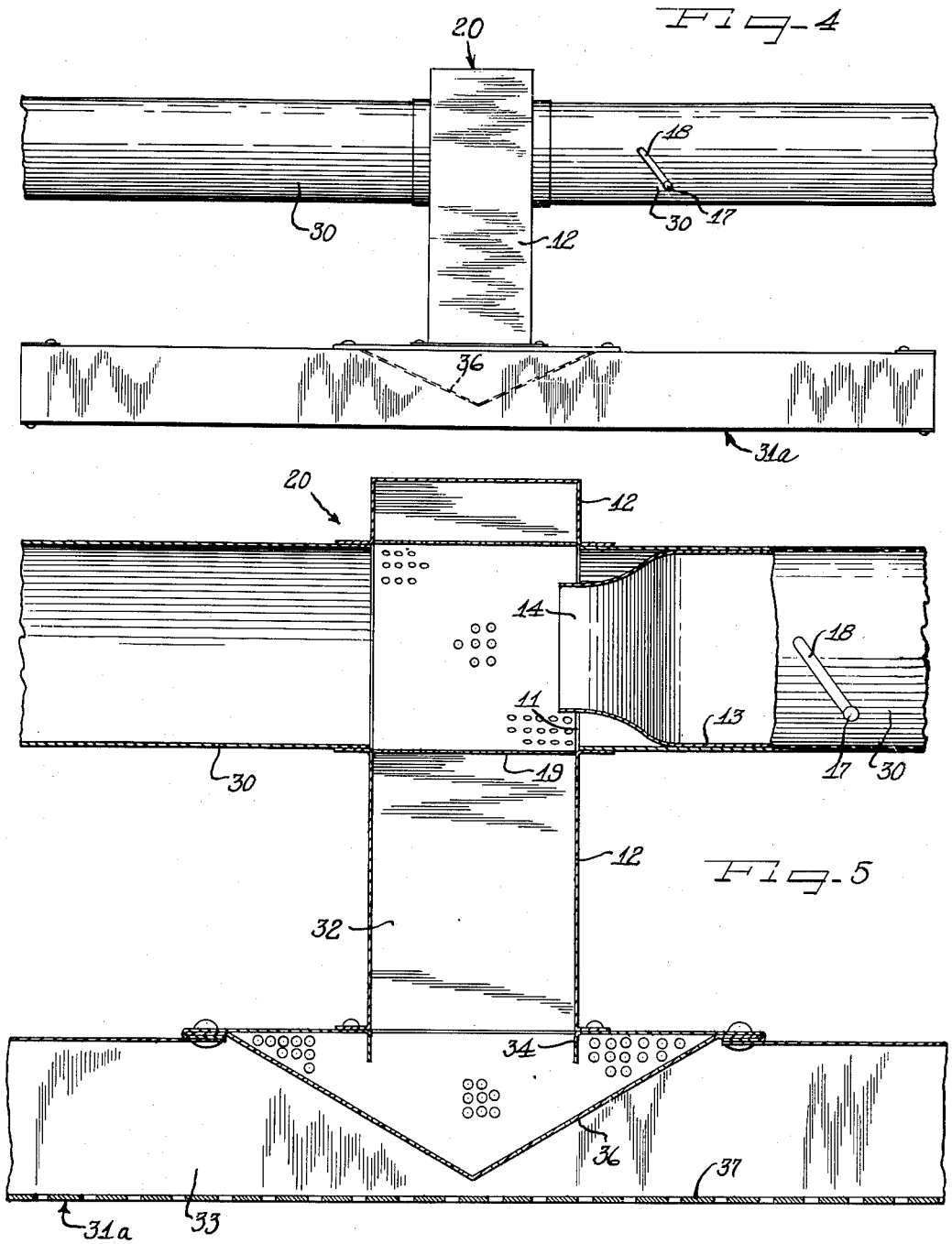

2,734,447

HIGH PRESSURE CONVERTER

Edwin J. Kurek, Chicago, Ill., assignor to The Pyle-National Company, Chicago, Ill., a corporation of New Jersey Application June 20, 1951, Serial No. 232,554

11 Claims. (Cl. 98—40)

This invention relates generally to fluid flow apparatus and more particularly to an improved fluid pressure conversion mechanism wherein the static pressure of a supply fluid stream is converted into a velocity pressure at a predetermined location in a duct system in order to obtain a transitory depression of static pressure to a pressure value less than upstream pressure but greater than atmospheric pressure and greater than or equal to the pressure at the predetermined location, whereby a selected volume of fluid at a lower static pressure may be bled-off into a secondary duct system.

Although the principles of the present invention are of general utility in any fluid distributing system, the principles of the present invention find a particularly useful application in connection with ventilating apparatus.

In some forms of ventilating apparatus, it has been found desirable to exploit the provision of small and compact duct systems carrying pressurized fluids such as air at relatively high quantitative values of static pressure. By providing a high pressure duct system, the requisite volumes of pressure air may be transported efficiently to a point of utilization which is quite remote from the actual pressurization source.

In some installations, however, it is necessary and desirable that a supply volume of fluid such as air be drawn off from the main high pressure system at an intermediate branch location.

In accordance with the principles of the present invention, a conversion mechanism is provided to obtain a transitory depression of static pressure to a value less than the upstream pressure but greater than atmospheric pressure or the pressure at a selected bleed-off point wherein selected quantities of pressurized fluid may be conveniently bled from a high pressure duct system without reducing the over-all efficiency of a high pressure duct arrangement.

More specifically, the present invention contemplates the provision of a high pressure duct carrying a supply of pressurized air and having a nozzle with a restricted throat portion coaxially disposed in the duct in alignment with an opening communicating with a secondary duct, or take-off duct. The restricted throat of the nozzle converts so much of the static pressure head of the supply air stream carried in the high pressure duct into a velocity head at the locale of the opening as is necessary so that a quantity of pressurized fluid at a lower pressure than the supply air stream but at pressure higher than the pressure in the take-off duct may be bled-off into the take-off duct.

Downstream of the nozzle, the increased velocity head is again converted into a static head so that efficient transportation of the air supply stream continues without unnecessary interference.

By advantageously exploiting the pressure characteristics of the air stream flowing through the nozzle, the relative axial alignment of the opening in the high pressure duct and the nozzle in the high pressure duct may be selectively adjusted to vary the quantity of air bled-off into the take-off duct in accordance with specific requirements.

A specific feature of the present invention resides in the provision of a conversion mechanism similar to that described above in combination with an outlet mechanism wherein a ventilating fluid such as pressurized air is flowed from the take-off duct into a third duct mechanism through a diffusion means and subsequently through an outlet provided for the third duct means which comprises a perforated distribution panel having an open area of predetermined proportion, thereby to further diffuse the air fluid displaced from the third duct means at a reduced pressure and reduced velocity into a space to be ventilated.

It is a principle of the present invention, therefore, to provide an improved conversion mechanism for a fluid distributing system.

Another object of the present invention is to provide a ventilation system wherein a supply air stream transported under relatively high pressure may be diffused into a space to be ventilated at reduced pressure and velocity to afford ventilation which is substantially free of detectible drafts.

A further object of the present invention is to provide a conversion mechanism for converting a positive static pressure head of predetermined quantitative value in a supply fluid stream into a velocity pressure head, whereby a selected volume of air at a reduced static pressure head may be drawn off from the supply air stream.

Many other advantages, features and additional objects of the present invention will become manifest upon making reference to the detailed description that follows and the accompanying sheets of drawings in which a preferred structural embodiment of a fluid distributing system incorporating the principles of the present invention is shown by way of illustrative example.

On the drawings:

Figure 1 is a composite schematic view showing in the upper portion thereof a diagrammatic view of a conversion mechanism provided in accordance with the principles of the present invention and indicating in the lower portion thereof the variations in pressure occurring within the conversion mechanism, wherein the curves $P_v$, $P_s$, and $P_t$ represent the velocity pressure, the static pressure, and the total pressure variations along the conversion mechanism.

Figure 2 is a perspective view showing in fragmentary form and with parts broken away for the sake of clarity of fluid distributing system constructed in accordance with the principles of the present invention;

Figure 3 is an enlarged fragmentary broken view showing additional details of construction of the conversion mechanism provided in accordance with the principles of the present invention and illustrating the application of the conversion mechanism to one form of a ventilating system;

Figure 4 is a fragmentary elevational view of a conversion mechanism provided in accordance with the principles of the present invention as applied to another form of ventilation apparatus; and Figure 5 is an enlarged broken cross-sectional view with parts shown in elevation showing additional details of construction of the mechanism provided in Figure 4.

As shown on the drawings:

The 1951 edition of Heating, Ventilating and Air Conditioning Guide (chapter 31, pages 669 et seq.) show it to be well recognized in the art that the sum of static pressure and velocity pressure is called total pressure, and is a measure of the total energy in an air stream moving at an appreciable velocity. Furthermore, it is known that every change in cross-sectional area of a duct results in a conversion of energy manifested principally by the mutual conversion of static pressure and velocity pressure. That is to say, in a converging duct, the air velocity will be accelerated and some pressure head will be converted into velocity pressure. Restoration of the air stream to initial duct size produces a static pressure regain in that the mutual conversion occurs reversibly.

These physical principles are advantageously exploited according to the present invention by mutually converting the static pressure and the velocity pressure components of a total pressure in a duct carried air stream moving at an appreciable velocity by means of a reduced throat in the duct and thereupon re-converting the static pressure and velocity pressure components in a discrete zone in the duct extending downstream from the throat. Means are provided to form an opening in the duct at the discrete zone. The relationship of the cross-sectional areas of the throat and the duct and the relationship of the spacing between the throat and the opening are such that the static pressure inside of the duct at the opening is maintained in excess of the pressure outside of the duct at the opening, thereby to bleed a quantity of air from the duct outwardly through the opening.

In Figure 1 is shown a duct 10 comprising what shall be referred to as a first duct carrying an air supply stream at relatively high pressure. At point A, the total pressure $P_t$ is indicated on the curve $P_t$, which value is representative of a summation of the components of such total pressure, namely, the values of the static pressure indicated on the curve $P_s$ and the velocity pressure indicated on the curve $P_v$.

An opening 11 is provided in the duct 10 and a take-off duct 12, which shall be referred to herein as a secondary duct system or a second duct or a bleed-off duct, is connected to the first duct 10 at the locale of the opening 11.

A nozzle or flow restrictor 13 is telescoped into the duct 10 and is provided with a restricted throat 14 of reduced cross-sectional area, the throat 14 being arranged in concentric coaxial disposition relative to the duct 10.

A duct 16 is telescopically related to the duct 10 and is spaced downstream of the nozzle 13.

At point B in the duct 10 corresponding to the full line position shown in Figure 1 wherein the beginning of convergence of the throat 14 of the nozzle 13 occurs, the values of $P_t$, $P_s$ and $P_v$ remain relatively unchanged.

At point C, which point corresponds to the smallest cross-sectional area of the convergent throat 14 of the nozzle 13 and which also corresponds to the edge portion of the second duct 12 at the opening 11 in the full line position of the duct 10, the value of the static pressure is shown forming the low point of the curve $P_s$, the nozzle 13 having converted the static pressure of the air supply stream into a velocity pressure head corresponding to the value of velocity pressure forming the high point on the curve $P_v$. The low point, of course, represents a quantitative pressure value which is higher than the pressure in the take-off duct. Under normal ventilating usage, the branch duct will be at atmospheric pressure and, accordingly, the transitory depression of static pressure along the curve $P_s$ will result in a depression of the static pressure to a value lower than the upstream pressure but higher than the atmospheric pressure.

It will be noted that the static pressure at the opening 11, in other words, the static pressure across the duct 12 is equal to the quantity X as measured on the graph corresponding to the point D.

It will be appreciated that downstream of the throat 14, the curve $P_s$ will rise and the curve $P_v$ will fall so that relative axial positioning of the nozzle 13 and the opening 11, together with the duct 12 will change the static pressure at the opening 11 or across the duct 12. For example, if the nozzle 13 were maintained stationary and the duct 10 were moved relative thereto to locate the duct 12 at the point E, the static pressure across the duct 12 would be equal to the quantity Y and if the duct 10 were moved to the position indicated at F, the static pressure across the duct 12 would be equal to the quantity Z indicated at F on the graph.

It will be appreciated that the relative axial alignment of the opening 11 and the nozzle 13 can be readily effected by moving either the nozzle alone, a portion of the duct alone, or by effecting combined movement of both.

In the preferred structural embodiments shown in Figures 2–5 by way of illustrative example only, I have provided a duct 10 having an axially adjustable nozzle 13 formed with a convergent throat 14 coaxially disposed relative to the duct 10 and locked in selected axial position by means of a latch 17 (Figure 5) which projects outwardly from the nozzle 13 and which engages a slot 18 formed in the walls of the duct 10.

The opening 11 provided in the duct 10 in the particular embodiment shown is surrounded by a perforated bleed-off collar 19 which is part of the second duct 12 provided to receive the selected volume of air bled from the air supply stream.

In Figure 2, the conversion mechanism provided in accordance with the principles of the present invention is incorporated in two separate embodiments of a ventilation system. The high pressure duct 10 is shown as comprising a riser carrying a supply of pressurized ventilating air.

In the structure shown in the lower portion of the figure, a conversion mechanism is indicated at 20 for bleeding off a supply of air from the main air supply stream into the second duct 12 forming a primary plenum chamber for a plurality of panel units indicated at 21a, 21b, 21c and 21d.

In Figure 3, the details of construction of this arrangement are shown. Each of the panel units 21a, 21b, 21c and 21d forms a secondary plenum chamber 22 which lies subjacent the primary plenum chamber 23 formed by the second duct 12. An opening 24 controlled by a valve 26 consisting of a plate threadedly adjustable on a spindle 27 forming a part of the panel unit 21a controls the flow of air from the primary plenum chamber 23 into the secondary plenum chamber 22. A diffusion trough 28 having perforated walls is located in registry with the opening 24 to assist in diffusing a supply of air from the primary plenum chamber 23 into the secondary plenum chamber 22 at reduced velocity and reduced pressure.

The lower wall of the panel unit 21a comprises a perforated distribution plate 29 having an open area of predetermined proportion so that the supply of air displaced outwardly of the secondary plenum chamber 22 will be free of detectible drafts.

In the arrangement shown in the upper portion of Figure 2 a structure incorporating a smaller branch duct 30 is shown carrying a supply of high pressure air to a plurality of converters 20, there being one converter 20 provided for each respective panel unit 31a, 31b, 31c and 31d. In the enlarged views of Figures 4 and 5, the structural details of this arrangement are shown.

The second duct 12 again forms a primary plenum chamber here indicated at 32 and communicating with a secondary plenum chamber 33 formed by one of the panel units, for example, 31a. An opening 34 provided between the primary plenum chamber 32 and the secondary plenum chamber 33 is equipped with a perforated diffuser 36 so that a supply of air at reduced pressure and reduced velocity will flow into the secondary plenum chamber 33 for further displacement outwardly through a perforated distribution plate 37 having an open area of predetermined proportion and into a space to be ventilated.

By utilizing the high pressure converter mechanism herein described, it is possible to exploit the advantageous provision of a high pressure distribution system in combination with ventilating units having low velocity outlets.

The system described is also particularly advantageous in connection with zone balancing since the high pressure converter can be used to selectively obtain transitory depressions of static pressure or to convert a high pressure air supply stream so that varied quantities of air at lower pressures may be employed as supplied by a plurality of branch ducts.

It will be understood that other structural modifications might be suggested by those versed in the art, however, it should be clearly understood that I wish to embody within the scope of this invention all such modifications as reasonably and properly come within the scope of my contribution to the art.

I claim as my invention:

1. Apparatus for bleeding off selected quantities of air from a high pressure duct, comprising, a duct carrying a supply of pressurized air at a predetermined total pressure, conversion means in said duct to concurrently increase the velocity pressure head component of the total pressure and to transitorily reduce the static pressure head component of the total pressure at a predetermined location in said duct to a value greater than the atmospheric pressure but less than the upstream pressure, said conversion means including flow restriction elements operative together with said duct to concurrently reduce the velocity pressure head component of the total pressure and increase the static pressure head component of the total pressure downstream of said predetermined location in said duct, and take-off duct means at said location to bleed off a selected quantity of air at a reduced total pressure from said duct the relationship of the cross-sectional areas of said flow restriction elements and said high pressure duct and the relationship of the spacing between said flow restriction elements and said take off duct means being such that the static pressure inside of said high pressure duct at said take off duct means is maintained in excess of the pressure in said take off duct means, thereby to bleed a quantity of air from said high pressure duct outwardly through said take off duct means.

2. Apparatus for bleeding off selected quantities of air from a high pressure duct, comprising, a duct carrying a supply of pressurized air at a predetermined total pressure, conversion means in said duct to concurrently increase the velocity pressure head component of the total pressure and reduce the static pressure head component of the total pressure at a predetermined location in said duct to a value greater than the atmospheric pressure, said conversion means including flow restriction elements operative together with said duct to concurrently reduce the velocity pressure head component of the total pressure and increase the static pressure head component of the total pressure downstream of said predetermined location in said duct, and take-off duct means at said location to bleed off a selected quantity of air at a reduced total pressure from said duct, said conversion means being adjustable to selectively control the proportional quantitative value of said components relative to the total pressure at said predetermined location of said duct the relationship of the cross-sectional areas of said flow restriction elements and said high pressure duct and the relationship of the spacing between said flow restriction elements and said take off duct means being such that static pressure inside of said high pressure duct at said take off duct means is maintained in excess of the pressure in aid take off duct means, thereby to bleed a quantity of air from said high pressure duct outwardly through said take off duct means.

3. In a ventilating apparatus, a supply duct carrying an air stream at an appreciable velocity from an upstream source exhibiting a total pressure appreciably above atmospheric pressure to a downstream zone exhibiting a lesser total pressure, said duct having upstream and downstream duct portions of substantially equal cross-sectional area, convergent means in said duct between said upstream and downstream portions and having a throat of lesser cross-sectional area than the cross-sectional area of said duct, whereby the static pressure and the velocity pressure components of the total pressure of the air stream are mutually converted at said throat and are re-converted in a discrete zone in said duct extending downstream from said throat, and means forming an opening in said duct at said discrete zone, the relationship of the cross-sectional areas of said throat and said duct and the relationship of the spacing dimension between said throat and said opening being such that the static pressure inside of said duct at said opening is maintained in excess of the pressure outside of said duct at said opening, thereby to bleed a quantity of air from said duct outwardly through said opening.

4. In a ventilating apparatus as defined in claim 3, said convergent means comprising a nozzle, and means effecting relative axial adjustment of said nozzle and said opening to vary the relationship of said throat to said opening, whereby the quantum of excess pressure at said opening may be selectively adjusted.

5. In a ventilating apparatus as defined in claim 3, a second duct connected to said supply duct at said opening, said second duct having air diffuser means connected thereto at a point of utilization to distribute air bled off from the supply duct.

6. In a ventilating apparatus as defined in claim 3, said convergent means comprising a movable nozzle, and mounting means confining movement of said nozzle for adjustment relative to said opening to vary the quantum of excess pressure at said opening, whereby air may be bled off from said supply duct.

7. In a ventilating apparatus as defined in claim 5, said air diffuser means comprising duct means forming a plenum chamber, diffuser means between said plenum chamber and said second duct to flow the air into the plenum chamber at reduced velocity from said second duct, and additional diffuser means forming an outlet for said plenum chamber to further diffuse air displaced from said plenum chamber at reduced pressure and reduced velocity outwardly to the point of utilization.

8. In a ventilating apparatus as defined in claim 3, said convergent means comprising a generally tubular member telescopically slidable in said first duct, and adjustment means to lock said tubular member in alignment relative to said opening to selectively vary the quantum of excess pressure at said opening.

9. The method of bleeding off selected quantities of air from a supply duct which includes the steps of flowing an air stream at an appreciable velocity from an upstream source at a total pressure greater than atmospheric pressure to a downstream zone exhibiting a lesser total pressure, mutually converting and reconverting the static pressure and the velocity pressure components of the total pressure of said air stream by flowing the air stream through a restricted throat of lesser cross-sectional area than the cross-sectional area of the air stream both upstream and downstream of the throat to produce a discrete zone of static pressure regain wherein the reduced static pressure increases from a value lower than its upstream value to its downstream value, and bleeding air from the duct at those portions of said discrete zone wherein the static pressure regain is manifested by a static pressure at a value greater than atmospheric pressure.

10. The method of using a convergent duct section in an air duct to bleed off air from the air duct which includes the steps of mutually converting and reconverting static pressure and velocity pressure components of a duct carried air stream at a total pressure head of greater than atmospheric pressure by flowing the air stream through the convergent duct section to produce a static pressure regain within a discrete zone along the length of the air stream, and communicating a bleed off at atmospheric pressure with said air stream in said discrete zone and at those portions of said zone wherein the static pressure is greater than atmospheric pressure.

11. In a ventilating apparatus as defined in claim 3, and means to vary said spacing dimension to vary the quantum of excess pressure at said opening.

References Cited in the file of this patent

UNITED STATES PATENTS

| | | |
|---|---|---|
| 1,179,406 | Davis | Apr. 18, 1916 |
| 1,296,968 | Klein | Mar. 11, 1919 |
| 1,887,938 | Lewis | Nov. 15, 1932 |
| 1,918,927 | Otto | July 18, 1933 |
| 1,973,623 | Hanlon | Sept. 11, 1934 |
| 1,999,148 | Anderson | Apr. 23, 1935 |
| 2,032,692 | Foss | Mar. 3, 1936 |
| 2,168,783 | Rucier | Aug. 8, 1939 |
| 2,285,346 | Moncrief | June 2, 1942 |
| 2,304,628 | Damerel | Dec. 8, 1942 |
| 2,313,256 | Morgan | Mar. 9, 1943 |
| 2,341,296 | Slade | Feb. 8, 1944 |
| 2,372,830 | Honerkamp et al. | Apr. 3, 1945 |
| 2,580,835 | Raider | Jan. 1, 1952 |

FOREIGN PATENTS

| | | |
|---|---|---|
| 530,178 | Great Britain | Dec. 6, 1940 |
| 737,015 | France | Sept. 26, 1932 |